United States Patent [19]
Koch et al.

[11] 3,912,565
[45] Oct. 14, 1975

[54] METHOD OF PREPARING SHIRRED, ELASTIC, FLEXIBLE ARTICLES

[75] Inventors: Walter T. Koch; Robert F. Gillespie, both of Havertown, Pa.

[73] Assignee: FMC Corporation, Philadelphia, Pa.

[22] Filed: Jan. 24, 1972

[21] Appl. No.: 220,147

[52] U.S. Cl. .................. 156/85; 156/244; 156/290; 264/230; 264/342 R; 264/342 RE; 264/DIG. 71
[51] Int. Cl.² .......................................... B29C 27/00
[58] Field of Search ......... 156/84, 86, 160, 244, 85, 156/229, 290, 297; 264/342 R, 342 RE, DIG. 77, 181, 189, 230, DIG. 71, 51, 176 R, 178 R, 210 R, 288, 194, 231, 291; 260/75 NA, 858, 75 TN, 2.5 AN

[56] References Cited
UNITED STATES PATENTS

| | | | |
|---|---|---|---|
| 1,544,312 | 6/1925 | Gray | 2/228 |
| 3,461,199 | 8/1969 | Campbell | 264/342 RE |
| 3,536,797 | 10/1970 | Cowan et al. | 264/210 R |
| 3,551,540 | 12/1970 | Pellicciari et al. | 264/342 RE |
| 3,584,108 | 6/1971 | Nelson et al. | 264/288 |
| 3,590,112 | 6/1971 | Civardi | 264/342 R |
| 3,639,917 | 2/1972 | Althouse | 2/270 |
| 3,644,157 | 2/1972 | Draper | 156/290 |

*Primary Examiner*—Charles E. Van Horn
*Assistant Examiner*—F. Frisenda

[57] ABSTRACT

Method of preparing a shirred, elastic, flexible article by attaching to a sheet material a thin layer of flexible polyurethane material which is heat shrinkable in only one direction thereof, and thereafter heating the layer of polyurethane material to effect shrinkage thereof and shirring of the sheet material which is attached thereto.

9 Claims, 4 Drawing Figures

METHOD OF PREPARING SHIRRED, ELASTIC, FLEXIBLE ARTICLES

The present invention is directed to an improved method of preparing a shirred, elastic, flexible article.

Flexible articles having shirred, elastic portions, as for example, along openings in wearing apparel, protective covers and the like, are conventionally produced by stretching a layer of rubber or other elastic material and, while being held in such stretched condition, sewing the same to a sheet material. Once attached and permitted to relax, the contracting elastic layer, which may be in the form of a strip, sheet or filament, causes the sheet material attached thereto to shirr or gather. In such conventional process, attachment of the elastic layer by sewing is slow, tedious and costly. More important, difficulties are encountered in maintaining a uniform tension on the elastic layer during its attachment to the sheet material and, also in handling of the shirred article once such elastic layer is relaxed. Accordingly, a primary object of this invention is to provide an improved method for preparing shirred, elastic, flexible articles.

Another object is the provision of an improved method for preparing shirred, elastic articles which involves no stretching of any components of such articles during the actual assembly thereof.

Still another object is to provide an improved method for making shirred, elastic articles in which the assembly of the components thereof and the actual shirring may be effected in independent stages which are separated as to time and location.

A further object is to provide an improved method for preparing shirred, elastic articles in which conventional slow and costly sewing procedures are not required.

A still further object is the provision of an improved method for making shirred, elastic, flexible articles which is rapid, economical, simple, and which can be tailored to provide different degrees of article shirring.

The above and other objects of the invention are achieved by a method in which a thin layer of flexible polyurethane material, which is heat shrinkable in the desired direction of article shirring, is disposed in direct contact with at least one side of a flexible sheet material and attached thereto without any significant shrinkage or other distortion of such layer. Subsequently, the layer of polyurethane material is heated to cause shrinkage thereof whereby the sheet material attached thereto is shirred.

Assembly of the layer of polyurethane material and sheet material as described above may be achieved, as for example, by the use of adhesives, heat sealing, ultrasonic horns, or sewing. Preferably, but not necessarily, the layer of heat-shrinkable polyurethane material and sheet material are attached to each other at only spaced locations thereof and desirably along lines or areas which are spaced from each other and extend substantially perpendicular to the direction in which such layer is capable of shrinking.

It is important in the method of the present invention that the heat-shrinkable layers which are employed be formed of polyurethane materials. Layers of polyurethane material may be stretched while at an elevated temperature and, if held under tension during the cooling thereof, will retain substantially their stretched lengths, yet may be shrunk to their original lengths by heat.

It is known that structures formed of materials other than polyurethane materials, as for example polypropylene and plasticized vinyl chloride polymers, may be subjected to treatment as described above and that such structures will also retain their stretched lengths and are heat-shrinkable. Distinguishing the heat-shrinkable layers of polyurethane materials from such other structures, however, is that once shrunk these layers exhibit the elasticity and recovery rate characteristics which are essential in shirred articles and which are not offered by structures formed of other materials. More particularly, a heat-shrinkable layer formed of polyurethane materials, after initial heat shrinkage, may be repeatedly elongated to its stretched length at the temperature of the ambient atmosphere and in each instance, returns rapidly to substantially its shrunken length when relaxed after elongation. With these characteristics of the layer of polyurethane material, shirred articles formed in accordance with the method of the present invention are capable of being repeatedly tensioned and relaxed without any apparent sacrifice in the shirring experienced by such articles and without any significant delay in article shirring as it is relaxed from a tensioned condition.

The amount of shrinkage experienced by the layer of polyurethane material, and thus the degree of shirring of the resulting article, may be varied within a wide range. In effect the shrinkage of the layer of polyurethane material may be tailored to suit specific article applications, with a shrinkage of from 20% to 45% being preferred in making shirred articles having elastic properties similar to those made by conventional processes using a rubber strip as a shirring means.

The flexible, heat shrinkable polyurethane material layer employed in the method of the present invention is formed by shaping, as by extrusion, molten polyurethane materials into the form of a tape, ribbon, sheet, film or tube or like structure followed by uniaxial stretching of such structure to orient the molecules thereof. The formulations and method of making thermoplastic polyurethane resins or compounds which are suitable for use in the present invention do not constitute part of the present invention. Completely cured thermoplastic polyurethane resins or compounds which are satisfactory for use in the present invention are readily available commercially, for example, "Estane 58054 Compound" manufactured by B.F. Goodrich Co. of Cleveland, Ohio. Extenders, processing aids, stabilizers, blowing agents, pigments, colorants, etc. may be incorporated into the thermoplastic polyurethane resins or compounds if so desired.

As heretofore mentioned the thermoplastic polyurethane resins or compounds may be shaped into a desired layer by conventional procedures, as for example by extruding in a molten condition as a continuous stream, followed by rapid quenching of such stream as on a chill roll or in a bath of cool water or other liquid. The layer of polyurethane material thus formed may be collected for subsequent processing at a later stage or, in continuous operations, may be uniaxially stretched directly after its formation. This is conveniently achieved by known techniques, as by streching such layer of polyurethane material longitudinally between spaced pairs of differential speed rolls; that is, with one such pair of rolls being rotated at a more rapid speed than the other of such pair of rolls. For reasons as hereafter described, the layer of polyurethane material is stretched to an extent greater than the elasticity desired in the finished shirred article.

During stretching, the layer of polyurethane material is heated to within an orientation temperature range which extends from a temperature above the second order phase transition temperature of the polyurethane material and below the temperature at which relaxation of the orientation effect, produced by stretching, occurs so rapidly that the layer retains no significant orientation once stretching is ceased. This orientation temperature range for polyurethane materials will vary and will range generally from about 40°C to 145°C. While in its stretched condition, the layer of polyurethane material is cooled to the temperature of the ambient atmosphere.

This stretched layer of polyurethane material will retain substantially its stretched length and when maintained at a constant temperature well below its orientation temperature it exhibits fair dimensional stability. Prior to its use, however, the stretched layer of polyurethane material is often exposed to varying temperatures, as during storage and transit, and thus may experience at least some premature shrinkage. Such shrinkage may be non-uniform along the layer and thus impart varying shirring properties in resulting articles, and even if uniform, may be unsuitable for use in shirred article manufacture.

Accordingly, in the method of the present invention the uniaxially oriented layer of polyurethane material is heat set by being brought to a temperature slightly above its second order phase transition temperature, permitted a limited relaxation, and then cooled to the temperature of the ambient atmosphere. Shrinkage of the layer at this stage may range up to 40% or more and preferably from about 10% to 30%. Once cooled the layer is dimensionally stable; that is, undergoes no significant shrinkage, until heated at least to the temperature employed during the heat-setting thereof.

As employed in the description and claims of the present invention, the terminology, "sheet material" may consist of textile materials formed of natural or synthetic fibers which are in a woven, non-woven, knitted, or other construction, or may be in the form of films or sheets capable of withstanding the elevated temperatures to which the elastic layer is subjected to during its attachment and shrinking.

Articles formed by the method of the present invention have at least portions thereof which are shirred or gathered, as in the case of shirred openings in wearing apparel, shower caps, dish covers and the like. Included also are articles which are completely shirred to facilitate compact storage thereof. Such articles may be employed, for example, as awnings, swimming pool covers, wrapping material and etc. Thus, the layer of polyurethane material may be in the form of a narrow strip tape or ribbon or may be relatively wide film or web.

An elastic layer of polyurethane material may be attached to one or opposite sides of the sheet material which is to be shirred. Any suitable means may be employed to effect such attachment, as for example, impulse heat sealing or ultrasonic apparatus, adhesives, sewing or metal fasteners. Once attached shrinkage of the layer of polyurethane material can be accomplished by merely heating the same, as with a hot gas or liquid, to a temperature above that at which such layer was heat set. At this layer of polyurethane material shrinks, the sheet material attached thereto, of course, assumes a shirred or gathered condition along the areas of attachment.

In the drawing, FIG. 1 is a diagrammatic illustration of the method employed in making the layer of heat shrinkable polyurethane material which is used in the method of the present invention;

Figure 1:
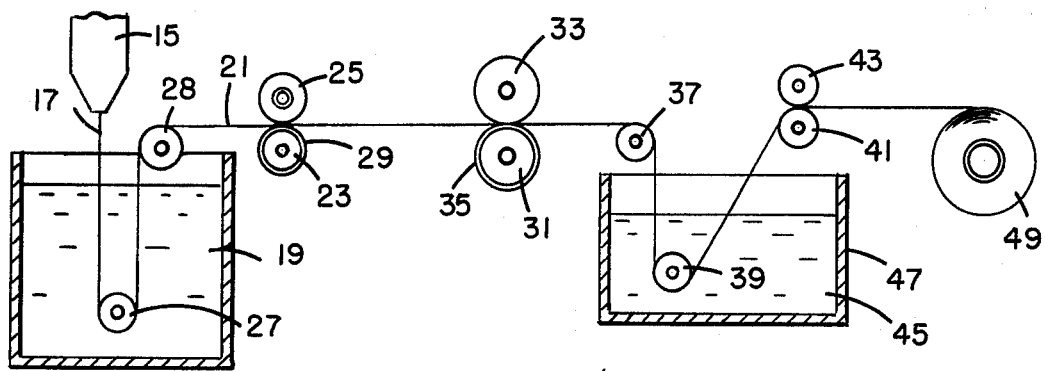

With reference to the drawing, FIG. 1 illustrates the manufacture of a layer, and particularly a narrow tape, of uniaxially heat-shrinkable polyurethane material for use in the method of the present invention. More specifically, a commercial thermoplastic polyurethane compound is rendered molten in a conventional screw extruder, shown in part at 15, and is discharged through a die orifice as a continuous stream 17 which is quenched within a water bath 19 to provide a solid flat tape 21. A pair of driven rolls 23 and 25, assisted by guide rolls 27 and 28, effect removal of the tape 21 from the bath 19 without stretching the same, afterwhich the tape 21 may be collected and perhaps stored before further processing.

Preferably, and as illustrated, the tape 21 is uniaxially oriented by longitudinal stretching immediately after its formation. To facilitate such stretching, the nip roll 23 is provided with a rubber covering 29, while the nip roll 25 is of bare metal construction. Steam or other hot fluid is circulated through the nip roll 25 to effect heating of the tape 21 to within the orientation temperature range during its contact with such roll. If necessary, additional rolls may be provided to increase the arc of contact which the tape 21 makes with the surface of the nip roll 25.

Spaced from the rolls 23 and 25 is a like pair of driven nip rolls 31 and 33, in which the roll 31 is formed with a rubber covering 35 while the roll 33 is of bare metal construction. The nip roll 33 differs from the corresponding nip roll 25, however, in that no heated fluid is circulated therethrough. Suitable means not shown, are provided for rotating the pair of rolls 31 and 33 at a faster speed than the rolls 23 and 25 so as to longitudinally stretch and thus uniaxially orient the heated tape 21 during its passage between such pairs of rolls.

The longitudinally stretched tape 21 is at a temperature substantially below its orientation temperature range as it issues from between the nip rolls 31 and 33 and is passed directly, by guide rolls 37 and 39 and nip rolls 41 and 43, through a heated liquid bath 45 contained in a tank 47. The bath 45, which may be water, is heated to a temperature slightly above the second order phase transition temperature of the polyurethane material from which the tape 21 is formed and the nip rolls 41 and 43 are driven at such speed as to permit a predetermined, partial shrinkage of the tape 21 during its passage through such bath. The heat shrinkable and now heat-set, tape 21 rapidly assumes the temperature of the ambient atmosphere as it leaves the bath 45 and is transported to a suitable core for winding in roll form as shown at 49.

In the practice of the method of the present invention, a length of tape 21 from the roll 49 is placed in direct contact with one or both sides of a sheet material along the area of such sheet material which is to be shirred and is attached thereto. Other than smoothing out the sheet material and/or tape 21, no tension is necessary on either of such components. The tape 21 is then heated, as by hot air, to a temperature above its heat-setting temperature to effect shrinkage thereof to substantially its length prior to its longitudinal stretching. In view of the attachment between the tape 21 and sheet material, the sheet material will, of course, shirr or be gathered along the length of the tape as it is shrunk.

Figure 2:
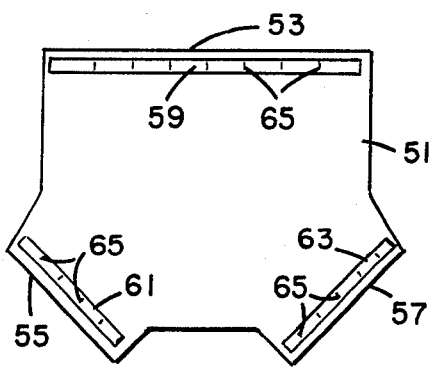
FIG. 2 is a diagrammatic view illustrating one stage in the manufacture of an article of wearing apparel by the method of the present invention.
Figure 3:
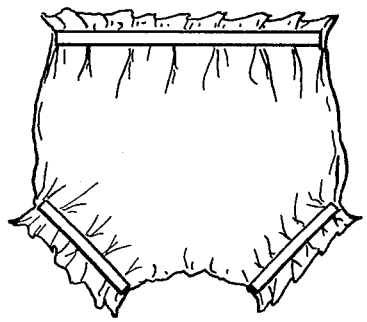
FIG. 3 illustrates the article of FIG. 2 in its finished, shirred condition.

Illustrated in FIG. 2 is an application of the method of the present invention in the manufacture of a garment which includes a body 51 formed, for example, of non-woven textile materials, and having openings 53, 55 and 57. Lengths of the heat shrinkable, heat-set tape 21 are removed from the roll 49 and, as indicated at 59, 61 and 63, are placed in direct contact with the garment body, adjacent to the openings 53, 55 and 57 therein. These lengths 59, 61 and 63 are then bonded to the garment body 51, as by an impulse heat-sealing apparatus, along lines 65 which are spaced from each other and extend substantially transverse to the direction in which such tape lengths are capable of shrinking. The attached tape lengths are then heated, as heretofore described, to shrink the same and cause the portions of the body 51 which is attached hereto to shirr or gather, as shown in FIG. 3.

Figure 4:
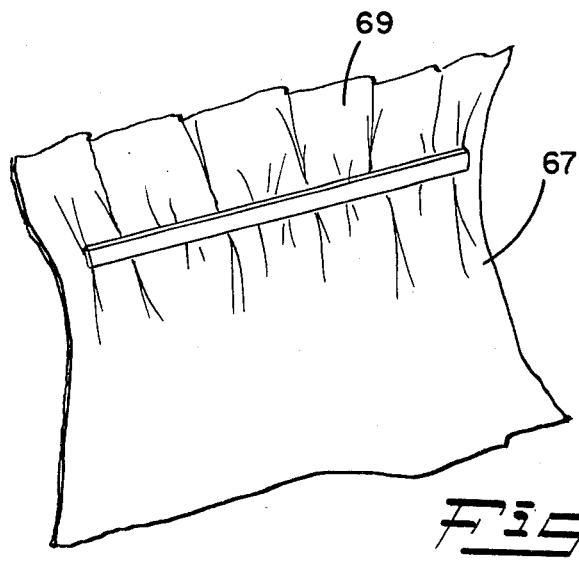
FIG. 4 illustrates another shirred article formed by the method of the present invention.

The method of the present invention is adapted for making a variety of shirred articles. Shown in FIG. 4 is a drape having a fabric body 67 which has been gathered or ruffled at 69 by the method of the present invention. While the above description makes reference to a solid tape 21 of polyurethane material, blowing agents may be incorporated into the thermoplastic polyurethane compound to provide heat-shrinkable, heat-set tapes having a foamed or cellular structure. Such foamed tape is, of course, of light weight and has a pleasant feel and is thus well suited for making shirred articles of wearing apparel.

For a better understanding of the method of the present invention, reference is made to the following examples.

EXAMPLE I

A thermoplastic polyurethane compound, commercially available from B.F. Goodrich Co. under the name of "Estane 58054 Compound", was fed to a conventional ¾" screw extruder where it was rendered molten, passed through two 80 mesh screen packs and then discharged through a 1" flat-type die. The feed section of the extruder barrel was maintained at a temperature of 121°C. while its discharge section was kept at about 171°C. The temperature of the extrusion die itself was maintained at about 175°C. Some variation in the specific temperatures could be tolerated without degradation of the polyurethane compound. For example, extrusion die temperatures of from 171°C. to 183°C. could be employed without appreciable differences in the characteristics in the resulting extruded product.

The extrudate was rapidly quenched within a water bath, maintained at a temperature of 25°C., and was collected as a continuous tape without being tensioned.

Subsequently this unoriented polyurethane tape was longitudinally stretched during advancement thereof between spaced pairs of nip rolls. Each pair of nip rolls included a metal roll and a cooperating rubber covered roll, with only the metal roll of the trailing of such pair of rolls being heated internally by steam. The rolls of both pairs of rolls were positively driven, with the leading pair of rolls having a speed five times greater than that of the trailing pair of rolls.

Upon leaving the leading pair of such nip rolls, the now longitudinally oriented polyurethane tape was at about the temperature of the ambient atmosphere and was heat-set by passage through a water bath heated to a temperature of from 60°C. to 65°C. A pair of nip rolls served to advance the tape through this heated bath and were driven as to permit such tape to shrink approximately 30% to 40% during this heat-setting stage. After removal from this water bath, the tape assumed the temperature of the ambient atmosphere and was collected without being tensioned.

Sections of tape exhibited a shrinkage of up to about 43% when immersed in boiling water and tensile properties of such sections, measured after the shrinkage thereof, were found to behave as true rubbers.

Another section of such heat-shrinkable, heat-set polyurethane tape was bonded at spaced intervals to a cellulosic non-woven fabric by means of a conventional impulse heat-sealing apparatus. These locations of bonding were spaced ¼" from each other and extended generally perpendicular to the direction in which the tape sections were capable of shrinking. No shrinkage or other distortion of the polyurethane tape was apparent during the bonding thereof to the non-woven fabric.

The non-woven fabric together with the attached tape was heated to 100°C. causing the tape to shrink and the non-woven fabric to shirr or gather. Once at room temperature the shirred non-woven fabric was repeatedly tensioned to stretched the tape to approximately its length prior to shrinking and to remove the folds or pleats from such fabric. The fabric was permitted to relax after each tensioning thereof and during each such relaxation the tape returned to its shrunken length and again shirred the fabric attached thereto.

Another section of the above-described heat-shrinkable, heat-set polyurethane tape was attached at spaced intervals thereof to a non-woven cellulosic fabric by means of an ultrasonically activated horn placed on the fabric side of the overlying components. Still other sections of such tape were sewn onto non-woven cellulosic fabrics using a variety of stitch patterns. All such assemblies were heated as described above to effect shrinkage of the tapes and shirring of the non-woven fabrics attached thereto. The resulting shirred articles exhibited stretch and shrink properties similar to that initially described in this example.

Set forth below is a tabulation of characteristics of a braided elastic (rubber) tape, as conventionally employed in the manufacture of shirred articles, a heat-shrinkable, heat-set polyurethane tape produced as described above and employed in the method of the present invention and a heat-shrinkable polyvinyl chloride tape, having 100 parts polyvinyl chloride dispersion grade resin, 60 parts dibutyl phthalate as primary plasticizer, 5 parts of an epoxy-type secondary plasticizer and 3 parts stabilizer. This last described tape was produced by a method as described above, with the exception that the extruder feed and discharge sections and nozzle were maintained at 132°C.; 177°C. and 205°C., respectively. These materials are designated below as Sample A, B and C, respectively.

| Sample | Yield in./lb. | Thickness in. | Width in. | Stress to Elongate | | Recovery from 100% Elongation after 5 seconds (%) |
|---|---|---|---|---|---|---|
| | | | | 50% grams | 100% grams | |
| A | 1050 | 0.035 | 0.375 | 400 | 710 | 100% |
| B | 1567 | 0.015 | 0.500 | 660 | 1030 | 95% |
| C | 1800 | 0.013 | 0.375 | 990 | 2130 | 92% |

EXAMPLE II

A commercial thermoplastic polyurethane as employed in Example I was blended with 0.3 phr (parts per hundred parts of resin) of a lower temperature blowing agent (p-p-oxybis-benzene sulfonyl hydrazide) 0.3 phr of high temperature blowing agent (azodicarbonamide) and a lower temperature blowing agent promoter-activator. This compound was fed into the extruder described in Example I in which the feed and discharge sections were heated to 121°C. and 177°C., respectively. The 1" flat die of such extruder was maintained at 182°C. whereupon the polyurethane rendered molten within the extruder, issued from the die as a continuous foamed stream. This extruded stream was rapidly quenched in a water bath to provide a tape having a foamed or cellular structure.

Using the procedure described in Example I the foamed polyurethane tape was stretched longitudinally and heat-set. The resulting heat-shrinkable, heat-set tape was opaque, lighter and more pleasing to the touch than the solid heat-shrinkable tape employed in Example I and, when heated to 100°C., exhibited a shrinkage of up to 28%.

In a manner as described in Example I, sections of this foamed, heat-shrinkable, polyurethane tape were attached to cellulosic non-woven fabrics, shrunk, and tested for their elastic properties which were found to be similar to those of elastic members employed in the manufacture of shirred articles.

Set forth below is a tabulation of the characteristics of a braided elastic (rubber) tape, a foamed heat-shrinkable, heat-set polyurethane tape as described above and a heat-shrinkable, heat-set polyvinyl chloride tape formed of a plasticized vinyl chloride polymer, as described in Example I, into which was blended 4 parts of azodicarbonamide as a blowing agent and a conventional blowing agent activator-stabilizer. During the extrusion of this foamable vinyl chloride composition, the feed and discharge sections of the extruder were heated to 155°C. and 185°C., respectively, and the nozzle was maintained at a temperature of 200°C. These tape materials are designated below as Samples A, B and C, respectively.

It is to be understood that changes and variations may be made without departing from the spirit and scope of the invention as defined in the appended claims.

We claim

1. A method of preparing a shirred, elastic, flexible article including the steps of disposing in direct contact with at least one side of a flexible sheet material a thin layer of flexible, uniaxially oriented, heat-set polyurethane material with the axis of orientation of such layer extending substantially parallel to the desired direction of article shirring, attaching the sheet material and the layer of polyurethane material together without relaxing the uniaxial orientation such layer, thereafter heating the layer of polyurethane material to a temperature above its heat-setting temperature to release the orientation therein, and permitting such layer of polyurethane material to shrink during the heating thereof to thereby effect shirring of the sheet material attached thereto.

2. A method as defined in claim 1 wherein the layer of polyurethane material is attached to the sheet material at only spaced portions thereof.

3. A method as defined in claim 2 wherein the layer of polyurethane material and sheet material are attached together along lines spaced from each other and extending substantially perpendicular to the axis along which the layer of polyurethane material is oriented.

4. A method as defined in claim 1 wherein the layer of polyurethane material is shrinkable from 30% to 45% of its oriented length when attached to the sheet material and is substantially completely relaxed following the heating thereof.

5. A method as defined in claim 4 wherein the layer of polyurethane material is shrinkable from 40% to 45% of its oriented length when attached to the sheet material.

6. A method as defined in claim 1 wherein the layer of polyurethane material is heat-set at a temperature of about 65°C and is heated to a temperature of about 100°C to effect release of the uniaxial orientation therein and the shrinkage thereof.

7. A method as defined in claim 1 wherein the uniaxially oriented, heat-set layer of polyurethane material is formed by shaping a molten thermoplastic polyurethane material into a web form and setting the same, heating the set web of polyurethane material and stretching the same in the direction of its longitudinal axis while it is at an orientation temperature between its second order phase transition temperature and

| Sample | Yield in./lb. | Thickness in. | Width in. | Stress to Elongate | | Recovery from 100% Elongation after 5 seconds (%) |
|---|---|---|---|---|---|---|
| | | | | 50% grams | 100% grams | |
| A | 1050 | 0.035 | 0.375 | 400 | 700 | 100% |
| B | 3880 | 0.010 | 0.500 | 235 | 390 | 96% |
| C | 3200 | 0.011 | 0.375 | 440 | 960 | 91% | below a temperature at which relaxation of the orientation effect achieved by stretching occurs so rapidly that the web retains no significant orientation once stretching is ceased maintaining the web in its stretched condition while cooling the same to a temperature below its second order phase transition temperature, heating the uniaxially oriented web of polyurethane material to a temperature slightly above its second order phase transition temperature and, while at such temperature, permitting the web to only partially shrink to a controlled extent, maintaining the web in its partially shrunk condition and cooling the same to a temperature below its second order phase transition temperature.

8. A method as defined in claim 7 wherein the uniaxially oriented web of polyurethane material is heated to a temperature of about 65°C during the partial shrinkage thereof and to a temperature of about 100°C during the subsequent relaxation thereof.

9. A method as defined in claim 1 wherein a layer is formed of foamed thermoplastic polyurethane material.

* * * * *

UNITED STATES PATENT OFFICE
CERTIFICATE OF CORRECTION

Patent No. 3,912,565     Dated October 14, 1975

Inventor(s) Walter T. Koch and Robert F. Gillespie

It is certified that error appears in the above-identified patent and that said Letters Patent are hereby corrected as shown below:

Column 8, line 21, after "orientation" insert --in--.

Signed and Sealed this seventeenth Day of February 1976

[SEAL]

Attest:

RUTH C. MASON
*Attesting Officer*

C. MARSHALL DANN
*Commissioner of Patents and Trademarks*